Patented Aug. 8, 1933

1,921,336

UNITED STATES PATENT OFFICE 1,921,336

COPPER-CONTAINING AZODYESTUFF

Karl Wiedemann, Leverkusen-I. G. Werk, and Heinrich Clingestein, Cologne-on-the-Rhine, Germany, assignors to General Aniline Works, Inc., New York, N. Y., a Corporation of Delaware No Drawing. Application December 30, 1931, Serial No. 584,016, and in Germany January 9, 1931

5 Claims. (Cl. 260—12)

The present invention relates to new azodyestuffs containing copper in a complex form, more particularly it relates to dyestuffs which may be represented by the probable general formula:

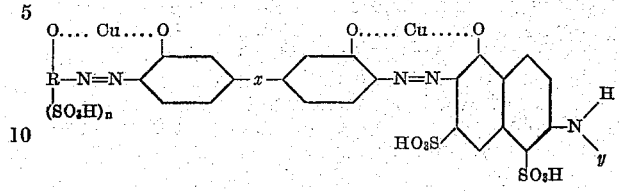

wherein R stands for a naphthalene nucleus which may be substituted by an amino group or an acylamino group, such as a benzoyl- or acetyl-amino group, the—O . . . Cu . . . O—group being attached to R in o-position to the azo group, —$x$— stands for a carbon-carbon linkage or for the urea bridge —NH—CO—NH—, $y$ stands for a hydrogen atom or for an acyl group, such as a benzoyl or acetyl group and "$n$" stands for the numbers 1 or 2.

Our new dyestuffs are obtainable by tetrazotizing a diaminodiphenyl or diaminodiphenyl-urea containing in o-position to each diazotized amino group an alkoxy group and coupling the resulting tetrazo compound with two mols of 2-amino-5-hydroxynaphthalene-1.7-disulfonic acid or an N-acyl derivatives thereof or with one mol of 2-amino-(or acylamino) 5-hydroxynaphthalene-1.7-disulfonic acid and with one mol of a hydroxynaphthalene-sulfonic acid or an amino (or acylamino)-hydroxynaphthalene-sulfonic acid other than 2-amino (or acylamino)-hydroxynaphthalene-1.7-disulfonic acid, and treating the dyestuffs with an agent yielding copper, for example, by heating in ammoniacal copper sulfate solution.

Our new copper-containing azodyestuffs are generally dark metallic, lustrous powders, soluble in water in form of their alkali metal salts and dyeing silk and the cellulosic fibre, such as cotton and viscose, blue to violet shades of excellent fastness to light.

The invention is illustrated by the following examples, without being limited thereto:

Example 1.—244 parts by weight of 4.4'-diamino-3.3'-dimethoxydiphenyl are tetrazotized and coupled in a soda-alkaline solution with 758 parts by weight of 2-acetylamino-5-hydroxynaphthalene-1.7-disulfonic acid. The isolated dyestuff is suspended in 30,000 parts by weight of water free from lime. The suspension is acidified, then 500 parts by weight of crystallized copper sulfate, dissolved in 2000 parts by weight of water, are added. The suspension is rendered alkaline by the addition of ammonia and heated for 2 hours at 75–80° C., thereby maintaining an ammoniacal reaction. The dyestuff having in its free state the probable following formula:

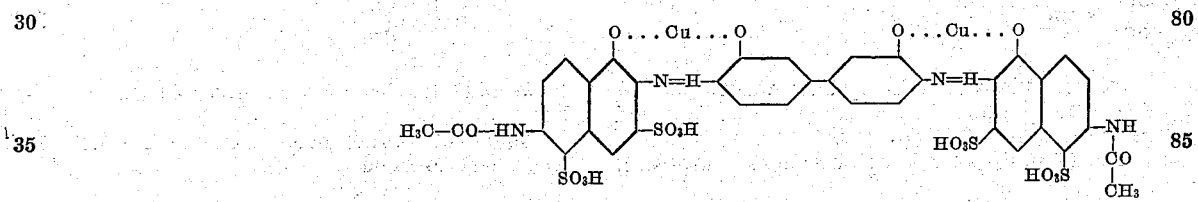

is isolated by the addition of some common salt; in its dry state it is a dark powder, soluble in water with a blue coloration and dyes cotton, silk and artificial silk of regenerated cellulose reddish blue shades of good fastness to light.

Example 2.—244 parts by weight of 4.4'-diamino-3.3'-dimethoxydiphenyl are tetrazotized and coupled in a weakly soda-alkaline solution with 319 parts by weight of 2-amino-5-hydroxynaphthalene-1.7-disulfonic acid, until the tetrazo compound can no more be detected. The diazoazo compound thus formed is combined in a stronger soda-alkaline medium with 224 parts by weight of 1-hydroxynaphthalene-4-sulfonic acid, and the isolated dyestuff is treated, as described in example 1, with 500 parts by weight of crystallized copper sulfate. The dyestuff having in its free state the probable following formula:

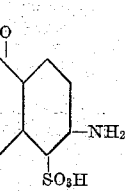

is soluble in water with a blue coloration and dyes cotton reddish blue shades of very good fastness to light.

Example 3.—302 parts by weight of 4.4'-diamino-3.3'-dimethoxydiphenylurea are tetrazotized and coupled in an aqueous sodaalkaline solution with 758 parts by weight of 2-acetylamino-5-hydroxynaphthalene-1.7-disulfonic acid. As described in Example 1, the dyestuff is then treated with 500 parts by weight of crystallized copper sulfate. The isolated and dried dyestuff having in its free state the probable following formula:

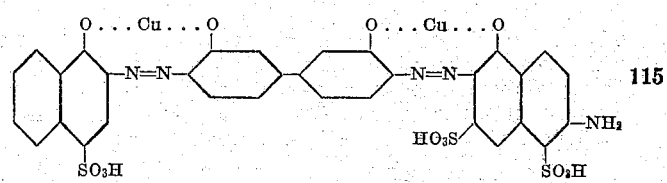

is soluble in water with a violet coloration and dyes cotton bluish-violet shades of very good fastness to light and ironing.

The same dyestuff is obtainable by diazotizing 1 mol of 5-nitro-2-amino-1-anisol, coupling with 1 mol 2-acetylamino-5-hydroxynaphthalene-1.7-disulfonic acid, reducing with sodium sulfide, phosgenating this aminoazodyestuff and finally coppering the same.

We claim:
1. Copper-containing azodystuffs of the probable general formula:

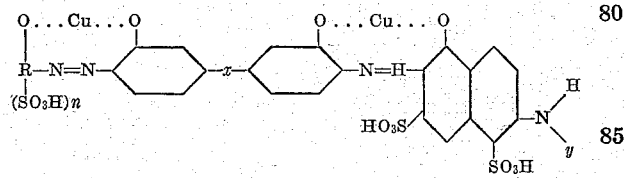

wherein R stands for a naphthalene nucleus which may be substituted by an amino group or an acylamino group, the —O...Cu...O-group being attached to R in o-position to the azo group, —x— stands for a carbon-carbon linkage or for a urea bridge, y stands for a hydrogen atom or for an acyl group and "n" stands for one of the numbers 1 and 2, being in the free state generally dark metallic, lustrous powders, soluble in water in form of their alkali metal salts and dyeing silk and the cellulosic fibre violet to blue shades of excellent fastness to light.

2. The copper-containing azodyestuff of the following formula:

being in its free state a dark powder, soluble in water with a blue coloration and dyeing cotton reddish blue shades of very good fastness to light.

3. Copper-containing azodyestuffs of the probable general formula:

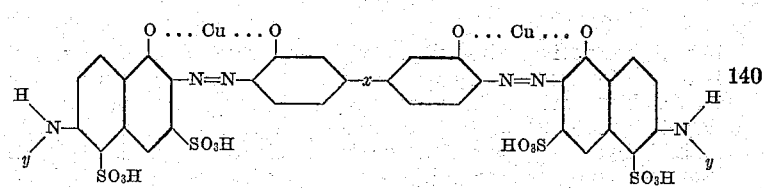

wherein —x— stands for a carbon-carbon linkage or for a urea bridge, and y stands for a hydrogen atom or for an acyl group, being in the free state generally dark metallic, lustrous powders, soluble in water in form of their alkali metal salts and dyeing silk and the cellulosic fibre violet to blue shades of excellent fastness to light.

4. The copper-containing azodyestuff of the following formula:

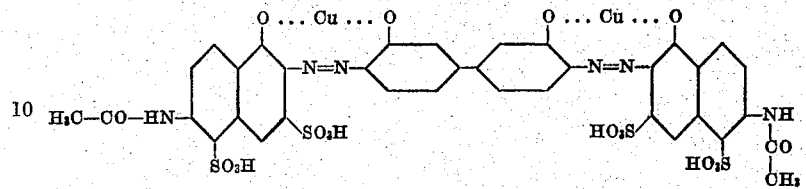

being in its free state a dark powder, soluble in water with a blue coloration and dyeing cotton, silk and artificial silk of regenerated cellulose reddish blue shades of good fastness to light.

5. The copper-containing azodystuff of the following formula:

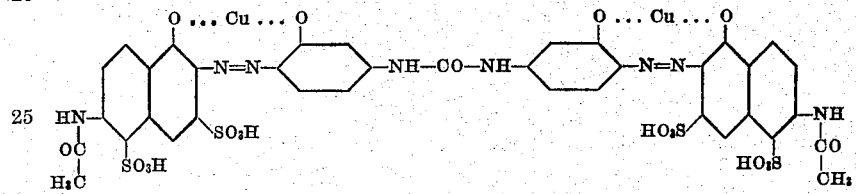

being in its free state a dark powder, soluble in water with a violet coloration and dyeing cotton bluish-violet shades of very good fastness to light and ironing.

KARL WIEDEMANN.
HEINRICH CLINGESTEIN.